United States Patent

Kanazawa et al.

[11] Patent Number: 6,040,052
[45] Date of Patent: Mar. 21, 2000

[54] MAGNETIC RECORDING MEDIUM

[75] Inventors: Hiromichi Kanazawa; Kunihiro Ueda, both of Saku; Katsuaki Yanagiuchi, Koromo; Tsunehiko Ikarashi; Masahide Kohno, both of Saku, all of Japan

[73] Assignee: TDK Corporation, Tokyo, Japan

[21] Appl. No.: 09/058,135

[22] Filed: Apr. 10, 1998

[30] Foreign Application Priority Data

Apr. 11, 1997 [JP] Japan .................................... 9-110151

[51] Int. Cl.$^7$ ........................................................ B32B 9/00
[52] U.S. Cl. .................................. 428/408; 428/694 TZ; 428/694 TF; 428/900
[58] Field of Search ............................. 428/408, 694 TZ, 428/694 TF, 900

[56] References Cited

U.S. PATENT DOCUMENTS

| | | | |
|---|---|---|---|
| 4,994,321 | 2/1991 | Nagao et al. | 428/336 |
| 5,080,971 | 1/1992 | Yokoyama et al. | 428/336 |
| 5,677,051 | 10/1997 | Ueda et al. | 428/336 |

FOREIGN PATENT DOCUMENTS

| | | |
|---|---|---|
| 63-136316 | 6/1988 | Japan . |
| 3-35419 | 2/1991 | Japan . |
| 7-66528 | 7/1995 | Japan . |
| 8-33994 | 3/1996 | Japan . |

*Primary Examiner*—Stevan A. Resan
*Attorney, Agent, or Firm*—Oblon, Spivak, McClelland, Maier & Nuestadt, P.C.

[57] ABSTRACT

A magnetic recording (vapor deposition) film medium having improved friction characteristics, running durability, and still characteristics are provided. The magnetic recording thin film medium comprises a non-magnetic support having on at least one surface thereof a magnetic layer, a protective layer formed on the magnetic layer, and a lubricant layer formed on the protective layer, wherein the magnetic recording medium is obtained by that after forming the magnetic layer on the surface of the non-magnetic support conveyed along the surface of a cooling roll, a carbon-containing plasma polymerized film is formed on the magnetic layer as the protective layer, while conveying the non-magnetic support having the magnetic layer along the surface of a cooling roll, and after surface-treating the carbon-containing plasma polymerized film on the same cooling roll as the protective layer-forming roll or on a different cooling roll from the protective layer-forming roll without applying a bias voltage to the surface-treatment roll, whereby a double bond component of carbon and oxygen is incorporated in the surface of the carbon-containing plasma polymerized film at a ratio of from 1.4 to 7.5 atomic % to the whole carbon amount of the surface of the carbon-containing plasma polymerized film, and the lubricant layer made up of an ester of a fluorinated alcohol and a fatty acid is then formed on the carbon-containing plasma polymerized film.

3 Claims, 2 Drawing Sheets

MAGNETIC RECORDING MEDIUM

FIELD OF THE INVENTION

The present invention relates to a magnetic recording medium and, more particularly to a magnetic recording thin film medium used as magnetic tapes, magnetic disks, etc.

BACKGROUND OF THE INVENTION

Because a magnetic recording thin film medium has a high packing density of magnetic substance, is suitable for high-density recording, and is profitable for the electromagnetic transformation characteristics as compared with a magnetic recording particulate medium, the magnetic recording thin film medium has been recently practically used.

In a magnetic recording thin film medium, usually a metal magnetic layer is formed on a non-magnetic support and further a lubricant layer is formed on the metal magnetic layer, whereby the still characteristics, the friction characteristics, etc., are improved.

However, because in the magnetic recording thin film medium, a magnetic layer is not formed by coating a coating composition formed by dispersing a ferromagnetic powder in a binder on a support, followed by drying as in magnetic recording particulate media, but the metal magnetic layer is formed on a support by a vacuum vapor deposition method, a sputtering method, an ion plating method, etc., by forming a lubricant layer only on the metal magnetic layer, there are problems that the magnetic recording medium is lacking in the reliability thereof, such as the friction characteristics, the still characteristics, the corrosion resistance, and the like.

Accordingly, recently, it is proposed to solve the above-described problems by forming a protective layer of a plasma polymerized film between the magnetic layer and the lubricant layer as disclosed in Japanese Patent Publication (KOKOKU) No. 7-66528.

However, in this case, the weather resistance, the practical running test, etc., can be improved, but because the adhesive property of the protective layer and the lubricant layer is inferior to cause releasing of the lubricant, there is a problem that attaching of the released lubricant to a head (head attaching), clogging of a head with the released lubricant (head clogging), etc., occur, whereby the magnetic recording medium is lacking in the durability.

Thus, as one of the methods of improving the adhesive property between the protective layer and the lubricant layer, a method of forming a functional group at the surface of the protective layer by surface-treating the protective layer and coating thereon a lubricant having an OH group or a COOH group at the terminal of the lubricant capable of chemically modifying the functional group is proposed as disclosed in Japanese Patent Public Disclosure (KOKAI) No. 63-136316. Furthermore, it is reported to improve the durability of a magnetic recording medium by forming a carbonyl group at the surface of the protective layer as described in Japanese Patent Public Disclosure (KOKAI) No. 3-35419, etc.

Also, Japanese Patent Publication (KOKOKU) No. 8-33994 proposes a technique of improving of the adhesive property between the protective layer and the lubricant layer by forming a diamond-like carbon layer on a metal magnetic thin film as a protective layer, immediately thereafter forming an oxide layer on the above-described diamond-like carbon layer by a vacuum treatment method, and thereafter forming thereon a lubricant layer.

However, even by these techniques described in above-described Japanese Patent Public Disclosure (KOKAI) Nos. 63-136316 and 3-35419, the effects of improving the sliding resisting lubricative property in the contact-type continuous sliding between a head and the surface of the magnetic recording medium, the running durability, the friction characteristics, etc., have not yet been obtained to the sufficiently satisfactory extent.

Also, in the method disclosed in above-described Japanese Patent Publication (KOKOKU) No. 8-33994, although an effect is obtained in the reduction of the head clogging, etc., there is a problem that a sufficient effect is not obtained in the still durability. The reason is perhaps considered to be that in the method disclosed in Japanese Patent Publication (KOKOKU) No. 8-33994, because a bias voltage is applied between a support conveying roller and the metal magnetic layer at the formation of the protective layer and the oxide layer, the damage of the protective layer at the formation of the oxide layer becomes large. This is considered that when a bias voltage is applied, a definite amount of the energy of the bias voltage is always additionally supplied to the ions generated by plasma discharging to the protective layer at the formation of the oxide layer, and even when the plasma discharging power at the initiation of the plasma treatment is low, the bias voltage-applied power is added to the plasma discharging power, whereby the damage given to the surface of the protective layer in the formation of the oxide layer through the plasma treatment process becomes large, which results in lowering the characteristics of the whole plasma polymerized film to lower the still characteristics.

SUMMARY OF THE INVENTION

An object of the present invention is to provide a magnetic recording thin film medium having improved friction characteristics, running durability, still characteristics, and the like.

That is, according to the present invention, there is provided a magnetic recording medium comprising a non-magnetic support, a magnetic layer formed on at least one surface of the support, a protective layer formed on the magnetic layer, and a lubricant layer formed on the protective layer, wherein the magnetic recording medium is obtained by that after forming the magnetic layer on the surface of the non-magnetic support conveyed along the surface of a roll, a carbon-containing plasma polymerized film is formed on the magnetic layer as a protective layer, while conveying the non-magnetic medium along the surface of a roll, and after surface-treating the carbon-containing plasma polymerized film on the same roll as the protective layer-forming roll or a different roll from the protective layer-forming roll without applying a bias voltage to the roll, whereby a double bond component of carbon and oxygen is incorporated in the surface of the carbon-containing plasma polymerized film at a ratio of from 1.4 to 7.5 atomic % to the total carbon amount of the surface of the carbon-containing plasma polymerized film, and the lubricant layer made up of an ester of a fluorinated alcohol and a fatty acid is then formed on the carbon-containing plasma polymerized film.

DETAILED DESCRIPTION OF THE INVENTION

The present invention is hereunder described in detail.

First, a method of producing the magnetic recording medium of the present invention is explained by referring to the accompanying drawings.

Figure 1:
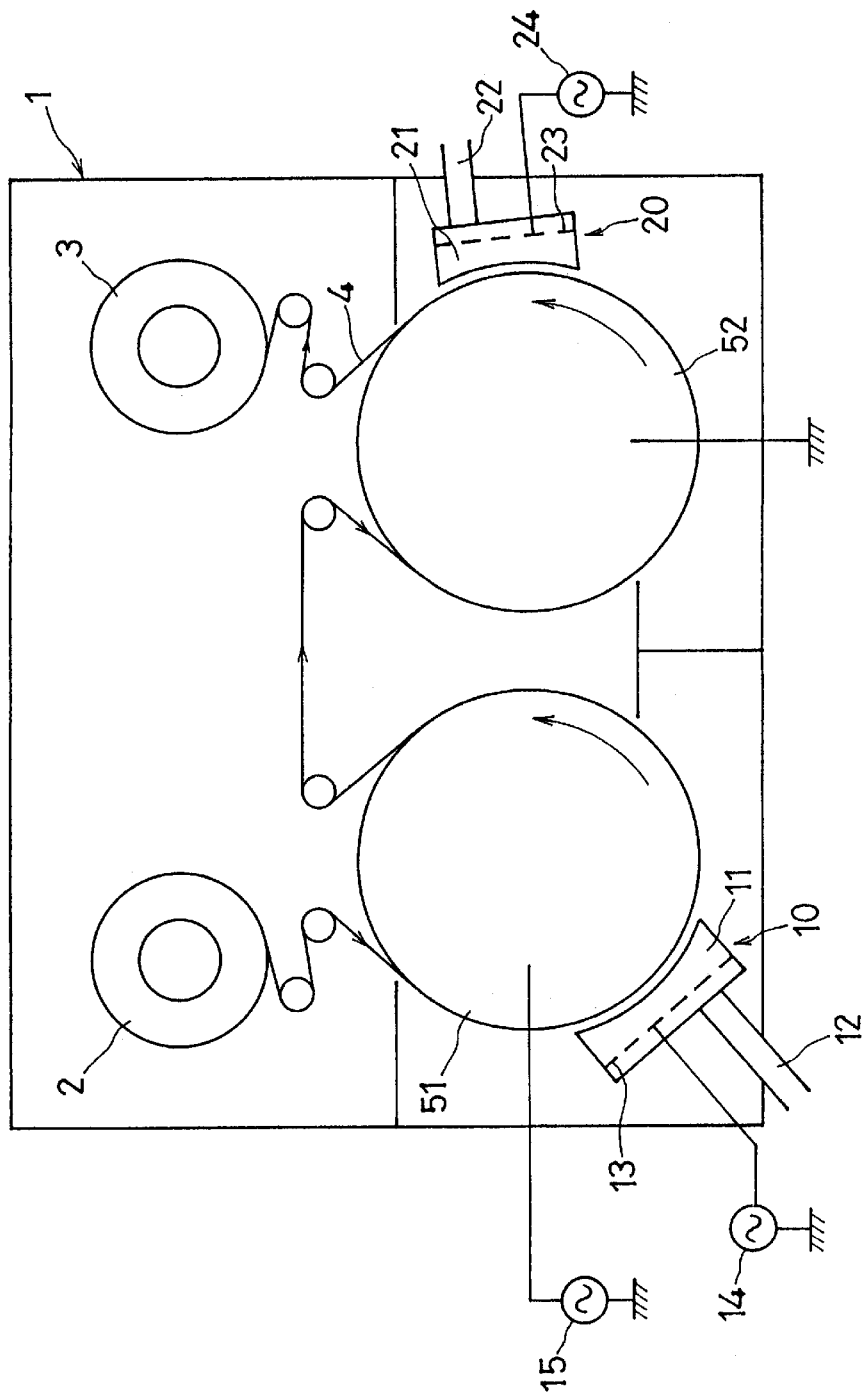
FIG. 1 is a schematic view showing an embodiment of a method of producing the magnetic recording medium of the present invention.

FIG. 1 is a schematic view explaining an embodiment of a method of producing the magnetic recording medium of the present invention.

In FIG. 1, in a vacuum chamber 1, a delivery roll 2, main rolls (cooling rolls) 51 and 52, and a winding roll 3 are disposed, and a non-magnetic support 4 delivered from the delivery roll 2 is conveyed along the surfaces of the main rolls 51 and 52 rotating to the allow direction and wound by the winding roll 3. In addition, on the delivery roll 2 has been wound the non-magnetic support 4 already formed on one surface thereof a magnetic layer, and when the non-magnetic support is conveyed along the surfaces of the main rolls 51 and 52, the support is conveyed in such a manner that the opposite surface side of the non-magnetic support to the surface having formed thereon the metal magnetic layer is brought into contact with the surfaces of the main rolls 51 and 52.

In the chamber 1, a protective layer (carbon-containing plasma polymerized film) forming means 10 and a protective layer (carbon-containing plasma polymerized film) surface treatment means 20 are disposed at definite positions facing the main rolls 51 and 52, respectively such that a protective layer is formed on the magnetic layer of the non-magnetic support delivered from the delivery roll 2 by the protective layer forming means 10 and that then, the surface treatment of the protective layer is carried out by the protective layer surface treatment means 20. The non-magnetic support 4 whose protective layer has been subjected to the surface treatment is wound by the winding roll 3, and thereafter, a lubricant layer is formed on the protective layer subjected to the surface treatment to provide a magnetic recording medium.

The protective layer forming means 10 has a protective layer forming nozzle 11 opening towards the main roll 51 and a gas inlet 12 connecting to the nozzle, and in the protective layer forming nozzle 11, an electrode 13 connected to an external electric source 14 is disposed. Also, by introducing a reaction gas from the gas inlet 12 and applying a predetermined electric power, a plasma is generated in the nozzle 11, whereby a protective layer is formed on the magnetic layer of the non-magnetic support conveying along the surface of the main roll 51 at the opening portion of the nozzle 11. The protective layer forming means 10 is generally connected to earth. In addition, to the main roll 51, a bias voltage can be applied by an external electric source 15. By applying the bias voltage, the plasma polymerization can be accelerated different from the case of applying the protective layer surface treatment which will be described below, whereby an effect of more hardening the carbon-containing plasma polymerized film can be obtained.

The protective layer surface treatment means 20 has a protective layer surface treatment nozzle 21 opening towards the main roll 52 and a gas inlet 22 connecting to the nozzle, and in the protective layer surface treatment nozzle 21, an electrode 23 connected to an external electric source 24 is disposed. Also, by introducing a reaction gas from the gas inlet 22 and applying a predetermined electric power, a plasma is generated in the nozzle 21, and the surface of the protective layer formed on the non-magnetic support 4 conveying along the surface of the main roll 52 at the opening portion of the nozzle 21 is treated.

It is preferred that the protective layer forming means 10 and the protective layer surface treatment means 20 are disposed with a partition between them for the pressure control and avoiding the occurrence of a contamination.

In the present invention, the surface treatment of the protective layer on the metal magnetic layer is carried out without applying a bias voltage to the main roll 52. Hitherto, a protective layer surface treatment, etc., is generally carried out by applying a bias voltage to the main roll 52, but by such a conventional method, a damage is rather given to the protective layer. On the other hand, in the present invention, by carrying out these treatments without applying a bias voltage to the main roll 52, the properties, in particular, the still characteristics of the protective layer, can be improved.

Figure 2:
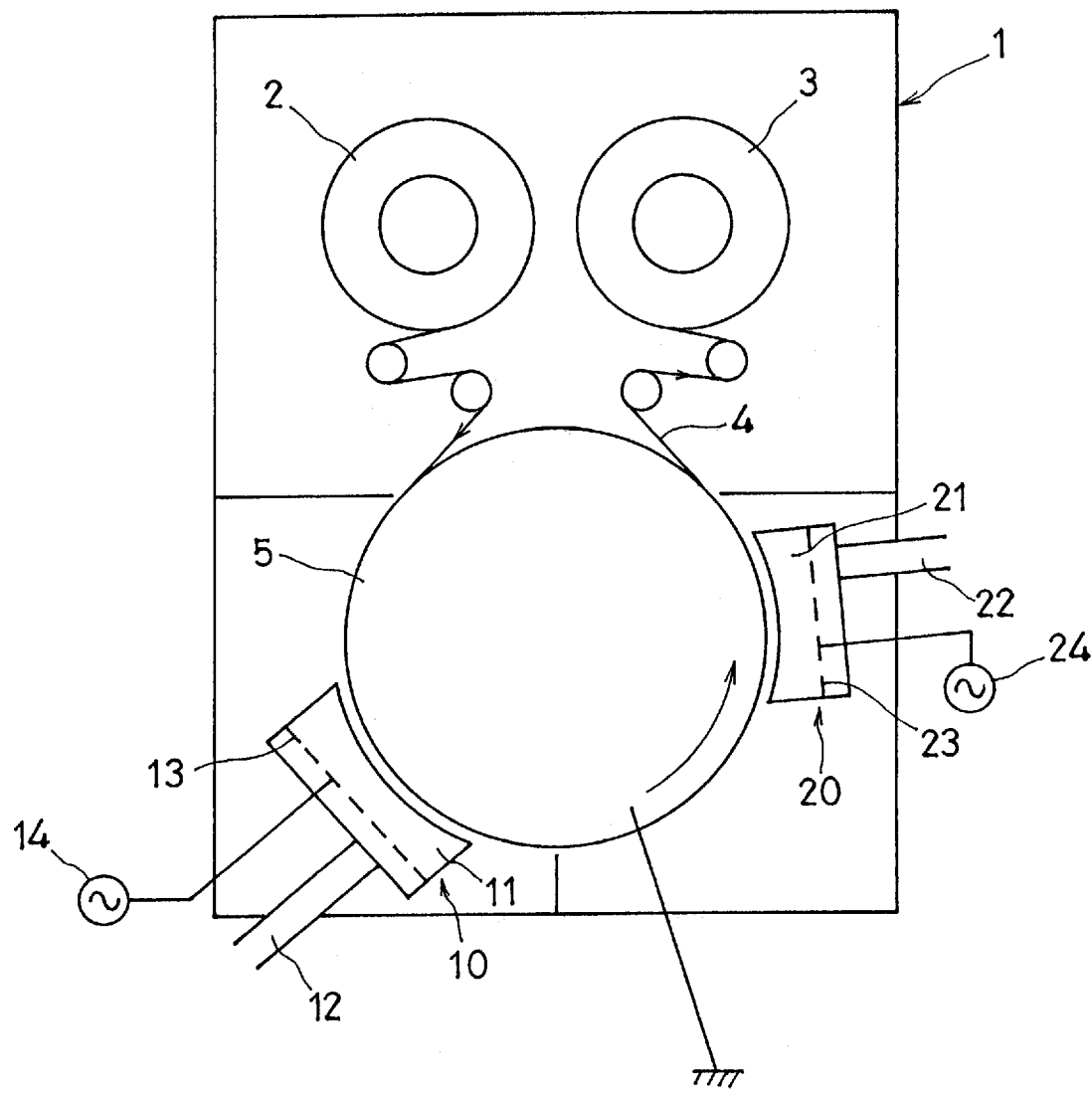
FIG. 2 is a schematic view showing another embodiment of a method of producing the magnetic recording medium of the present invention.

In addition, FIG. 1 shows an embodiment of carrying out the protective layer formation and the protective layer surface treatment on different rolls, respectively, but in the present invention, the protective layer formation and the protective layer surface treatment can be carried out on the same roll 5 as shown in FIG. 2. In addition, in FIG. 2, the same parts showing the same ones shown in FIG. 1 are shown by the same signs and the explanation of them are omitted. In the embodiment of FIG. 2, because a bias voltage is not applied at the time of the surface treatment of the protective layer, the protective layer formation is also carried out without applying a bias voltage.

In addition, in the present invention, the protective layer formation and the protective layer treatment are not always carried out in one pass, and for example, after forming the protective layer, the non-magnetic support is once wound by a winding roll, thereafter, the roll is transferred to the position of a delivery roll, and then, the surface treatment can be carried out by delivering the support. Also, after forming the protective layer and winding the non-magnetic support having the protective layer by the winding roll, by changing the conveying direction of the non-magnetic support, the surface treatment of the protective layer can be carried out.

There is no particular restriction on the material for the non-magnetic support used in the present invention, and the material for the support includes, for example, polyethylene terephthalate (PET), polyethylene naphthalate (PEN), polyimides, polyamides, polyvinyl chloride, polycarbonates, polyether-ether ketone (PEEK), and polysulfones. Also, the thickness of the support can be properly selected according to the use but is usually selected in the range of 4 to 40 μm.

A magnetic layer is formed on at least one surface of the non-magnetic support. As the material for the magnetic layer, magnetic metals, magnetic alloys, ferromagnetic metals, ferromagnetic alloys, etc., can be used, and of these materials, Co and Co alloys such as Co—Ni, Co—Cr, etc., are preferably used.

There is no particular restriction on the forming method of the magnetic layer, but usually, the magnetic layer is formed by directly vapor depositing Co or a Co alloy on the non-magnetic support, or by after vapor depositing an undercoat layer on the non-magnetic support, vapor depositing thereon Co or a Co alloy.

The vapor deposition of the magnetic layer can be carried out by a conventionally known method. For example, after evacuating the inside of a vapor deposition chamber to a pressure of about $1.33 \times 10^{-3}$ Pa, the metal for vapor deposition is melted by an electron gun to initiate the vapor deposition at the time of melting the whole metal. In this case, it is preferred for controlling the magnetic characteristics to introduce an oxidative gas such as oxygen, ozone, nitrous oxide, etc., into the chamber and carrying out the vapor deposition in a gas atmosphere thereof.

In addition, the thickness of the magnetic layer can be properly changed by the use but is usually from about 50 to 300 nm.

In addition, while in the above description, the formation of the magnetic layer by vapor deposition has been explained, in the present invention, the formation of the magnetic layer is not limited to the above-described method, but as a matter of course, the magnetic layer can be formed by other known means such as sputtering, ion plating, and the like.

The above-described protective layer is formed on the above-described magnetic layer. The formation of the protective layer can be suitably carried out by using the protective layer forming means 10 as shown in FIG. 1. In the present invention, as the protective layer, a plasma polymerized film containing carbon is used, and particularly, a carbon-containing plasma polymerized film formed by plasma polymerizing a hydrocarbon gas is preferably used. Also, at the surface of the carbon-containing plasma polymerized film, a double bond component of carbon and oxygen is formed and incorporated therein at a ratio of from about 1.4 to 7.5 atomic % to the total carbon amount of the surface of the carbon-containing plasma polymerized film without applying a bias voltage.

The carbon-containing plasma polymerized film in the present invention can be practically formed, for example, as follows.

First, in FIG. 1, after evacuating the inside of the chamber 1 to about $1.33 \times 10^{-3}$ Pa or lower, a hydrocarbon gas or a hydrocarbon gas and an additive gas are introduced into the nozzle 11 through the gas inlet 12 of the protective layer forming means 10, and also, an electric power is applied from the external electric source 14 to generate a plasma, whereby the carbon-containing plasma polymerized film is formed on the metal magnetic layer formed on the non-magnetic support 4 at the opening portion of the nozzle 11.

The introducing amount of the hydrocarbon gas or the hydrocarbon gas and the additive gas depends upon the size of the chamber 1 and is selected in the range of from about 1.33 to 133 Pa as a reaction pressure.

As the hydrocarbon gas, methane, ethane, propane, butane, pentane, hexane, heptane, octane, nonane, ethylene, propylene, acetylene, methylacetylene, toluene, benzene, etc., are illustrated, and they can be used singly or as a mixture of two or more kinds thereof.

As the additive gas, hydrogen, argon, helium, neon, oxygen, nitrogen, etc., are illustrated, and they can be used singly or as a mixture of two or more kinds thereof.

In the case of adding the additive gas, the additive gas is used at an additive gas/hydrocarbon gas ratio (flow mount ratio) of the range of from about 0.01 to 1, and particularly preferably from about 0.02 to 0.1 to the amount of the hydrocarbon gas. If the amount of the additive gas is too high to the hydrocarbon gas, the film-forming speed is lowered, while if the amount of the additive gas is too low, the film of the protective layer is hard to become dense according to the kind of the hydrocarbon gas.

A refractive index of the protective layer is preferably about 1.9 or higher, and more preferably from about 2.0 to 2.25.

As the discharging electric source 14, an electric source of a frequency of from about 10 to 450 kHz is preferred, and an electric source of a frequency of from about 50 to 200 kHz is particularly preferred. If the frequency of the electric source is lower than 10 kHz, the operation of a long time becomes difficult, while if the frequency is higher than 450 kHz, the dense film becomes hard to form.

The surface of the carbon-containing plasma polymerized film thus formed is treated such that the surface has a double bond of carbon and oxygen. As the surface treatment for forming and incorporating a definite amount of the double bond component of carbon and oxygen on and in the surface of the carbon-containing plasma polymerized film, a plasma treatment method is preferable. This is because by controlling the power of the plasma treatment and the treatment speed (treatment time), the formation of a double bond of carbon and oxygen can be easily and stably controlled. By such a treatment, the double bond component of carbon and oxygen is formed at the surface of the carbon-containing plasma polymerized film by the protective layer surface treatment means 20 without applying a bias voltage at a ratio of from 1.4 to 7.5 atomic % to the total carbon amount of the surface of the carbon-containing plasma polymerized film. Practically, a reaction gas is introduced into the inside of the nozzle 21 through the gas inlet 22 of the protective layer surface treatment means 20 and a voltage is applied from the electric source 24 to generate a plasma in the inside of the nozzle 21, whereby the surface of the protective layer on the non-magnetic support is treated at the opening portion of the nozzle 21. In the present invention, the application of a bias voltage at the surface treatment is undesirable because in this case, the surface of the protective layer is damaged to lower the characteristics of the protective layer.

As the gas used for the plasma treatment, there is no particular restriction, if the gas is oxygen ($O_2$) or a gas containing oxygen (such as, for example, carbon dioxide, ozone, nitrogen dioxide, nitrous oxide, and nitrogen monoxide), but oxygen ($O_2$) is particularly preferred.

As the plasma treatment, the treatment that the power (W)×the treatment time (second) is from about 150×700, and preferably from about 400 to 600 is preferred. If the power ×the treatment time is smaller than 150, the double bond of carbon and oxygen is not sufficiently formed, while if the power ×the treatment time is larger than 700, there is a possibility of causing the problems that the double bond of carbon and oxygen is excessively formed and that the non-magnetic support is damaged.

As described above, the double bond component of carbon and oxygen is formed at the surface of the surface treated carbon-containing plasma polymerized film. In the present invention, examples of the double bond component of carbon and oxygen includes a functional group such as a carbonyl group, a carboxyl group, etc.

The amount of the double bond component of carbon and oxygen formed at the surface of the carbon-containing plasma polymerized film is from about 1.4 to 7.5 atomic %, and particularly preferably from about 1.8 to 4.6 atomic % to the total carbon amount of the surface of the carbon-containing plasma polymerized film.

In the present invention, the term "the surface of the carbon-containing plasma polymerized film" means the range within about 3 nm from the upper interface of the carbon-containing plasma polymerized film. The content of such component can be measured by, for example, using ESCA AXIS-HSX type (X-ray output: 240 W, analysis area: 2 mmφ, pass energy: 40 eV) manufactured by SHIMADZU CORPORATION, and the peak of the double bond of carbon and oxygen is defined by the peak obtained by fitting the position of higher by 4.0±0.2 eV the peak bonding energy (usually 285 eV) of the XPS C 1s spectrum as the center by the Gauss' function. Assuming that the detection sensitivity of carbon by the bonded state is same, the existing ratio of the double bond is determined by the intensity of the peak and shown by atomic %. In addition, by connecting the position of the bottom of the high energy side to the position of the bottom of the low energy side with the peak as the center, a background is provided. If the ratio of the double bond component of carbon and oxygen to the total carbon amount at the surface of the carbon-containing plasma polymerized film is less than 1.4 atomic %, the adsorbing points with the functional group of the lubricant become less, whereby the surface of the carbon-containing plasma polymerized film is not sufficiently covered with the lubricant layer. Thus, the friction characteristics are insufficient, and a sufficient effect for the durability is not obtained. On the other hand, if the ratio of the double bond component of carbon and oxygen to the total carbon amount is more than 7.5 atomic %, the adsorbing points become more than the number of the adsorbing molecules, whereby the friction resistance and the durability after storing the magnetic recording medium in a high-temperature high-humidity atmosphere are deteriorated.

The thickness of the carbon-containing plasma polymerized film can be properly changed according to the use but is usually from about 4 to 20 nm. If the film thickness is less than 4 nm, the film does not function as a protective layer, and also, the still characteristics and the friction characteristics are not improved. Also, if the film thickness is higher than 20 nm, the spacing loss becomes large, whereby the magnetic recording medium is not suitable for a medium aiming at a high-density recording.

Then, a lubricant layer is formed on the carbon-containing plasma polymerized film surface treated as described above. In the present invention, as the lubricant layer, a layer containing a lubricant having a functional group which causes an interaction with the above-described double bond component of carbon and oxygen is used. As such a lubricant, a fatty acid ester of a fluorinated alcohol is preferably used. Also, as the lubricant such as the fatty acid ester of a fluorinated alcohol having a functional group in the molecule, the lubricant containing a carbonyl group, a carboxyl group, etc., capable of being adsorbed to the carbon-oxygen double bond component at the surface of the above-described carbon-containing protective layer is preferred. As such a lubricant, the lubricants shown by following formulae (1) to (12) are illustrated, but the lubricant used in the present invention is not limited to them. In addition, the lubricants can be used singly or as a mixture two or more optional kinds of them.

$(C_nH_{2n+1})COO(CH_2)_k(C_mF_{2m+1})$ (1)

$(C_nH_{2n+1})CH\{(CH_2)_kCOO(CH_2)_l(C_mF_{2m+1})\}COO(CH_2)_j(C_pF_{2p+1})$ (2)

$(C_nH_{2n+1})CH\{(CH_2)_kCOOH\}COO(CH_2)_l(C_mF_{2m+1})$ (3)

$(C_nH_{2n-1})COO(CH_2)_k(C_mF_{2m+1})$ (4)

$(C_nH_{2n-1})CH\{(CH_2)_kCOO(CH_2)_l(C_mF_{2m+1})\}COO(CH_2)_j(C_pF_{2p+1})$ (5)

$(C_nH_{2n-1})CH\{(CH_2)_kCOOH\}COO(CH_2)_l(C_mF_{2m+1})$ (6)

$(C_nH_{2n+1})CH\{(CHR_1)COO(CH_2)_l(C_mF_{2m+1})\}COO(CH_2)_j(C_pF_{2p+1})$ (7)

$(C_nH_{2n-1})CH\{(CHR_1)COO(CH_2)_l(C_mF_{2m+1})\}COO(CH_2)_j(C_pF_{2p+1})$ (8)

$(C_nH_{2n+1})CR_1\{(CH_2)_kCOO(CH_2)_l(C_mF_{2m+1})\}COO(CH_2)_j(C_pF_{2p+1})$ (9)

$(C_nH_{2n-1})CR_1\{(CH_2)_kCOO(CH_2)_l(C_mF_{2m+1})\}COO(CH_2)_j(C_pF_{2p+1})$ (10)

$(C_nH_{2n+1})CR_1\{(CHR_2)COO(CH_2)_l(C_mF_{2m+1})\}COO(CH_2)_j(C_pF_{2p+1})$ (11)

$(C_nH_{2n-1})CR_1\{(CHR_2)COO(CH_2)_l(C_mF_{2m+1})\}COO(CH_2)_j(C_pF_{2p+1})$ (12)

In the above-described formulae (1) to (12), n is preferably at least 10, and particularly preferably from 14 to 22; j, l, and k each is preferably from 1 to 3; m and p each is preferably at least 4, and particularly preferably from 8 to 10; $R_1$ represents an alkyl group having from 10 to 22 carbon atoms or an alkenyl group having from 10 to 22 carbon atoms; and $R_2$ represents a hydrogen atom, an alkyl group having from 10 to 22 carbon atoms, or an alkenyl group having from 10 to 22 carbon atoms.

In the above-described lubricants, the lubricants shown by the formulae (1) to (6) are preferably used.

In addition, the thickness of the lubricant layer can be properly changed according to the use but is usually from 1 to 3 nm. The lubricant layer is formed by a coating method or a vapor deposition method but generally formed by a coating method. In the coating method, the above-described lubricant is dissolved in a solvent, and the solution is coated and dried. As the coating system, a gravure coating method, a reverse roll coating method, a die nozzle coating method, etc., can be properly selected according to the purpose, the use, etc.

The, the following Examples are intended to illustrate the present invention but not to limit the invention in any way.

Examples 1 to 20 and Comparative Examples 1 to 13

A magnetic layer (thickness 200 nm) was formed on a non-magnetic support made up of PET having a thickness of 6 μm by vapor deposition while introducing oxygen to Co. After evacuating the inside of a chamber for conveying a support (a non-magnetic support having formed thereon a magnetic metal by vapor deposition) at a pressure of 1.33×$10^{-3}$ Pa or lower, ethylene was used as a hydrocarbon gas, while conveying the support in the chamber, a predetermined amount of ethylene was introduced in the chamber such that the reaction pressure became 1.33 Pa, and plasma polymerization was carried out by applying a voltage of a frequency of 100 kHz to form a carbon-containing plasma polymerized film of 6 nm in thickness on the magnetic layer as a protective layer. In addition, at the formation of the protective layer, a bias voltage was not applied to the main roll. Then, after applying a plasma surface treatment to the surface of the protective layer on other main roll under the condition shown in Table 1 below, a lubricant shown in Table 2 was coated on the treated protective layer to form a lubricant layer. Each magnetic recording medium thus obtained was slit to a width of 8 mm to provide each sample.

Using the samples obtained, the ratio of the double bond component of carbon and oxygen, the friction durability, the friction durability after storing, the running durability, the still characteristics, and the heat attaching were evaluated by the methods described below. The results obtained are shown in Table 3.

[Ratio (ratio of C=O) of the double bond component of carbon and oxygen]

The ratio of the double bond component of carbon and oxygen to the total carbon amount at the surface of the protective layer was shown. Using "ESCA AXIS-HSX Type" (manufactured by SHIMADZU CORPORATION; X-ray output: 240 W, analysis area: 2 mm φ, pass energy: 40 eV), the peak obtained by fitting the position of higher by 4.0±0.2 eV than the peak bonding energy (usually 285 eV) of the XPS C 1s spectrum as the center by the Gauss' function was measured as the peak of the double bond of carbon and oxygen. By assuming that the detection sensitivity of carbon in the bonded state was the same, the existing ratio thereof was determined from the peak intensity as an atomic %. In addition, the position of the bottom of a high energy side was connected to the position of the bottom of a low energy side with the peat as the center to provide a background.

[Friction durability]

By repeatedly measuring the friction coefficient by the Euler's equation in a pin friction tester of a holding angle of 90°, the friction durability was evaluated. The pin had 2 mmφ, and as the pin, SUS 304 having a surface property of 0.2 S was used. The applied load was 10 g, the stroke was 50 mm, and the repeated times were 100 reciprocation.

[Friction durability after storing]

In the above-described friction durability test, after storing each sample for 3 days at 60° C. and 90% RH, the friction durability thereof was measured, and the results are shown.

[Running durability]

After recording a signal of 7 MHz to the whole length (120 minutes) of each sample tape by a S1500 deck manufactured by Sony Corporation, the repeating reproducing output was confirmed. In this test, the evaluation was carried out under three circumstances of 20° C., 60% RH; 40° C., 80% RH; and 0° C. The first pass output was defined as 0 dB, and the pass number until the output lowered by 1 dB was measured.

[Still characteristics]

Using the S1500 deck manufactured by Sony Corporation, the output at the start was defined as 0 dB, and the time of lowering the output by −1 dB was measured.

[Head attaching]

Using the S1500 deck manufactured by Sony Corporation, each sample was run at 100 passes under the circumstance of 20° C., 60% RH, and attaching of the released friction on the head was confirmed by an optical microscope, and the observed result was evaluated in the following four criteria. The attached area to the whole area of the contact portion was visually observed.

Evaluation:

A: The ratio of the attached area was from 0 to 5%.

B: The ratio of the attached area was from 6 to 20%.

C: The ratio of the attached area was from 21 to 40%.

D: The ratio of the attached area was 41% or more.

Example 21

By following the same procedure as in the case of Example 1 except that a bias voltage of −50 V was applied to the main roll at the formation of the protective layer, the formation of the protective layer and the plasma surface treatment of the protective layer were carried out on different main rolls, respectively to prepare each sample. The plasma surface treatment conditions and the lubricants used are shown in Table 1 and Table 2, respectively. About each of the samples prepared, the ratio of the double bond component of carbon and oxygen, the friction durability, the friction durability after storing, the running durability, the still characteristics, and the head attaching were evaluated by the same ranks as in Example 1. The results are shown in Table 3.

Comparative Example 14

By following the same procedure as in the case of Example 1 except that a bias voltage of −50 V was applied to a main roll at the formation of the protective layer and that a bias voltage of −50 V was applied to another main roll at the plasma surface treatment of the protective layer, the formation of the protective layer and the plasma surface treatment of the protective layer were carried out on different main rolls, respectively to prepare each sample. The plasma surface treatment conditions and the lubricants used are shown in Table 1 and Table 2, respectively. About each of the samples, the ratio of the double bond component of carbon and oxygen, the friction durability, the friction durability after storing, the running durability, the still characteristics, and the heat attaching were evaluated by the same ranks as in Example 1. The results are shown in Table 3.

Example 22

The formation of the protective layer and the plasma surface treatment of the protective layer were carried out on the same main roll, and then, by following the same manner as above, a sample was prepared. In both the formation of the protective layer and the plasma surface treatment of the protective layer, a bias voltage was not applied to the main roll. The plasma surface treatment condition and the lubricant used are shown in Table 1 and Table 2, respectively. About the sample, the ratio of the double bond component of carbon and oxygen, the friction durability, the friction durability after storing, the running durability, the still characteristics, and the heat attaching were evaluated by the same ranks as in Example 1. The results are shown in Table 3.

TABLE 1

| | Surface Treatment Conditions | | | | | |
|---|---|---|---|---|---|---|
| | Treatment gas | Power (W) | Treatment time (sec.) | Power x Treatment time (W · sec.) | Bias (V) | Protective layer formation and surface treatment process |
| P1 | $O_2$ | 100 | 1 | 100 | None | Two rolls |
| P2 | $O_2$ | 150 | 1 | 150 | None | Two rolls |
| P3 | $O_2$ | 100 | 4 | 400 | None | Two rolls |
| P4 | $O_2$ | 100 | 5 | 500 | None | Two rolls |
| P5 | $O_2$ | 100 | 6 | 600 | None | Two rolls |
| P6 | $O_2$ | 100 | 7 | 700 | None | Two rolls |
| P7 | $O_2$ | 100 | 8 | 800 | None | Two rolls |
| P8 | $O_2$ | 50 | 10 | 500 | None | Two rolls |
| P9 | $O_2$ | 50 | 2 | 100 | None | Two rolls |
| P10 | $O_2$ | 1000 | 1 | 1000 | None | Two rolls |
| P11 | $O_2$ | 1000 | 0.5 | 500 | None | Two rolls |
| P12 | $O_2$ | 50 | 60 | 3000 | None | Two rolls |
| P13 | $O_2$ | 100 | 180 | 18000 | None | Two rolls |

TABLE 1-continued

Surface Treatment Conditions

| | Treatment gas | Power (W) | Treatment time (sec.) | Power x Treatment time (W · sec.) | Bias (V) | Protective layer formation and surface treatment process |
|---|---|---|---|---|---|---|
| P14 | $CO_2$ | 100 | 4 | 400 | None | Two rolls |
| P15 | $O_2$ | 100 | 5 | 500 | −50 | Two rolls |
| P16 | $O_2$ | 100 | 5 | 500 | −300 | Two rolls |
| P17 | $O_2$ | 100 | 5 | 500 | None | One roll |

TABLE 2

| | Lubricant |
|---|---|
| T1 | $C_{10}H_{21}COOCH_2CH_2C_8F_{17}$ |
| T2 | $C_{14}H_{29}COOCH_2CH_2C_8F_{17}$ |
| T3 | $C_{16}H_{33}COOCH_2CH_2C_8F_{17}$ |
| T4 | $C_{22}H_{45}COOCH_2CH_2C_8F_{17}$ |
| T5 | $C_{14}H_{29}COOCH_2CH_2C_4F_9$ |
| T6 | $C_{14}H_{29}COOCH_2CH_2C_{10}F_{21}$ |
| T7 | $C_{14}H_{29}CH(COOCH_2CH_2C_8F_{17})CH_2COOCH_2CH_2C_8F_{17}$ |
| T8 | $C_{16}H_{33}CH(COOCH_2CH_2C_8F_{17})CH_2COOCH_2CH_2C_8F_{17}$ |
| T9 | $C_{18}H_{37}CH(COOCH_2CH_2C_8F_{17})CH_2COOCH_2CH_2C_8F_{17}$ |
| T10 | $C_{16}H_{33}CH(COOCH_2CH_2C_{10}F_{21})CH_2COOCH_2CH_2C_{10}F_{21}$ |
| T11 | $C_{16}H_{33}CH(COOCH_2CH_2C_8F_{17})CH_2COOH$ |
| T12 | $C_{16}H_{31}CH(COOCH_2CH_2C_8F_{17})CH_2COOCH_2CH_2C_8F_{17}$ |
| T13 | $C_{18}H_{35}CH(COOCH_2CH_2C_8F_{17})CH_2COOCH_2CH_2C_8F_{17}$ |
| T14 | $C_8F_{17}C_4H_9NH\text{—}NH_2$ |
| T15 | $(C_{16}H_{33})_2N\text{—}NH_2$ |
| T16 | $C_{16}H_{33}SiH_3$ |

TABLE 3

| | Ratio of Plasma C=O (at.%) | treatment | Lubricant | Friction durability | Friction durability after storing | Running durability 20° C., 60% RH | Running durability 40° C., 80% RH | Running durability 0° C. | Still characteristics | Head attaching |
|---|---|---|---|---|---|---|---|---|---|---|
| Example 1 | 1.4 | P2 | T3 | 0.28 | 0.29 | 100 | 90 | 95 | 150 | B |
| Example 2 | 1.8 | P3 | T3 | 0.23 | 0.24 | 110 | 110 | 105 | 200 | A |
| Example 3 | 2.1 | P4 | T3 | 0.22 | 0.23 | 120 | 115 | 115 | 220 | A |
| Example 4 | 4.6 | P5 | T3 | 0.23 | 0.25 | 120 | 110 | 110 | 210 | A |
| Example 5 | 7.5 | P6 | T3 | 0.24 | 0.28 | 115 | 90 | 100 | 170 | A |
| Example 6 | 2.0 | P8 | T3 | 0.23 | 0.25 | 110 | 110 | 100 | 220 | A |
| Example 7 | 3.1 | P11 | T3 | 0.22 | 0.25 | 120 | 115 | 115 | 220 | A |
| Example 8 | 2.0 | P14 | T3 | 0.23 | 0.24 | 110 | 105 | 100 | 200 | A |
| Example 9 | 1.8 | P3 | T1 | 0.25 | 0.26 | 95 | 90 | 95 | 195 | A |
| Example 10 | 1.8 | P3 | T2 | 0.25 | 0.27 | 110 | 105 | 105 | 205 | A |
| Example 11 | 1.8 | P3 | T4 | 0.24 | 0.26 | 100 | 100 | 100 | 200 | A |
| Example 12 | 1.8 | P3 | T5 | 0.25 | 0.28 | 95 | 95 | 90 | 190 | A |
| Example 13 | 1.8 | P3 | T6 | 0.25 | 0.26 | 100 | 100 | 100 | 200 | A |
| Example 14 | 1.8 | P3 | T7 | 0.24 | 0.26 | 105 | 100 | 105 | 200 | A |
| Example 15 | 1.8 | P3 | T8 | 0.23 | 0.25 | 110 | 110 | 105 | 210 | A |
| Example 16 | 1.8 | P3 | T9 | 0.22 | 0.24 | 10 | 120 | 120 | 230 | A |
| Example 17 | 1.8 | P3 | T10 | 0.22 | 0.24 | 105 | 100 | 100 | 205 | A |
| Example 18 | 1.8 | P3 | T11 | 0.23 | 0.24 | 95 | 95 | 90 | 200 | A |
| Example 19 | 1.8 | P3 | T12 | 0.23 | 0.25 | 110 | 100 | 100 | 200 | A |
| Example 20 | 1.8 | P3 | T13 | 0.23 | 0.24 | 110 | 105 | 105 | 205 | A |
| Example 21 | 2.2 | P4 | T3 | 0.22 | 0.23 | 120 | 120 | 110 | 225 | A |

TABLE 3-continued

| | Ratio of Plasma | | | Friction durability | | Running durability | | | Still | |
|---|---|---|---|---|---|---|---|---|---|---|
| | C=O (at.%) | treatment | Lubricant | Friction durability | after storing | 20° C., 60% RH | 40° C., 80% RH | 0° C. | characteristics | Head attaching |
| Example 22 | 2.1 | P17 | T3 | 0.23 | 0.24 | 120 | 115 | 115 | 220 | A |
| Comparative Example 1 | 1.8 | P3 | T14 | 0.29 | 0.3 | 80 | 75 | 75 | 150 | C |
| Comparative Example 2 | 1.8 | P3 | T15 | 0.28 | 0.31 | 75 | 60 | 60 | 150 | D |
| Comparative Example 3 | 1.8 | P3 | T16 | 0.29 | 0.35 | 70 | 50 | 55 | 145 | D |
| Comparative Example 4 | 1.3 | P1 | T3 | 0.31 | 0.33 | 75 | 70 | 70 | 140 | C |
| Comparative Example 5 | 10.2 | P7 | T3 | 0.23 | 0.36 | 110 | 30 | 90 | 80 | C |
| Comparative Example 6 | 1.0 | P9 | T3 | 0.32 | 0.34 | 60 | 45 | 55 | 120 | D |
| Comparative Example 7 | 8.8 | P10 | T3 | 0.24 | 0.35 | 115 | 60 | 100 | 140 | A |
| Comparative Example 8 | 16.8 | P12 | T3 | 0.24 | 0.38 | 55 | 5 | 40 | 10 | A |
| Comparative Example 9 | 1.8 | P3 | T3 | 0.4 | 0.51 | 10 | 3 | 5 | 10 | A |
| Comparative Example 10 | Unknown | P13 | | Tape damaged, evaluation impossible. | | | | | | |
| Comparative Example 11 | — | Not treated | T3 | 0.25 | 0.26 | 40 | 20 | 30 | 50 | D |
| Comparative Example 12 | 9 | P15 | T3 | 0.23 | 0.35 | 115 | 60 | 95 | 60 | A |
| Comparative Example 13 | 10.8 | P16 | T3 | 0.24 | 0.34 | 110 | 35 | 90 | 35 | A |
| Comparative Example 14 | 9.1 | P15 | T3 | 0.23 | 0.34 | 115 | 65 | 100 | 70 | A |

As described above in detail, according to the present invention, the magnetic recording (vapor-deposition) film media having improved friction characteristics, friction characteristics after storing, running durability, still characteristics, and the like are provided.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having on at least one surface thereof a magnetic layer, a protective layer formed on said magnetic layer, and a lubricant layer formed on said protective layer, wherein said magnetic recording medium is obtained by that after forming the magnetic layer on the surface of the non-magnetic support conveyed along the surface of a cooling roll, a carbon-containing plasma polymerized film is formed on the magnetic layer as the protective layer, while conveying the non-magnetic support having the magnetic layer along the surface of a cooling roll, and after surface-treating the carbon-containing plasma polymerized film on the same cooling roll as the protective layer-forming roll or on a different cooling roll from the protective layer-forming roll without applying a bias voltage to the surface-treatment roll, whereby a double bond component of carbon and oxygen is incorporated in the surface of the carbon-containing plasma polymerized film at a ratio of from 1.4 to 7.5 atomic % to the whole carbon amount of the surface of the carbon-containing plasma polymerized film, and the lubricant layer made up of an ester of a fluorinated alcohol and a fatty acid is then formed on the carbon-containing plasma polymerized film.

2. A magnetic recording medium of claim 1, wherein the ace treatment of the carbon-containing plasma polymerized is carried out a plasma treatment method.

3. A magnetic recording medium of claim 1, wherein the ace treatment of the carbon-containing plasma polymerized is carried out by a plasma treatment under the condition the power (W)×the treatment time (second) is from about to 700.

* * * * *